UNITED STATES PATENT OFFICE.

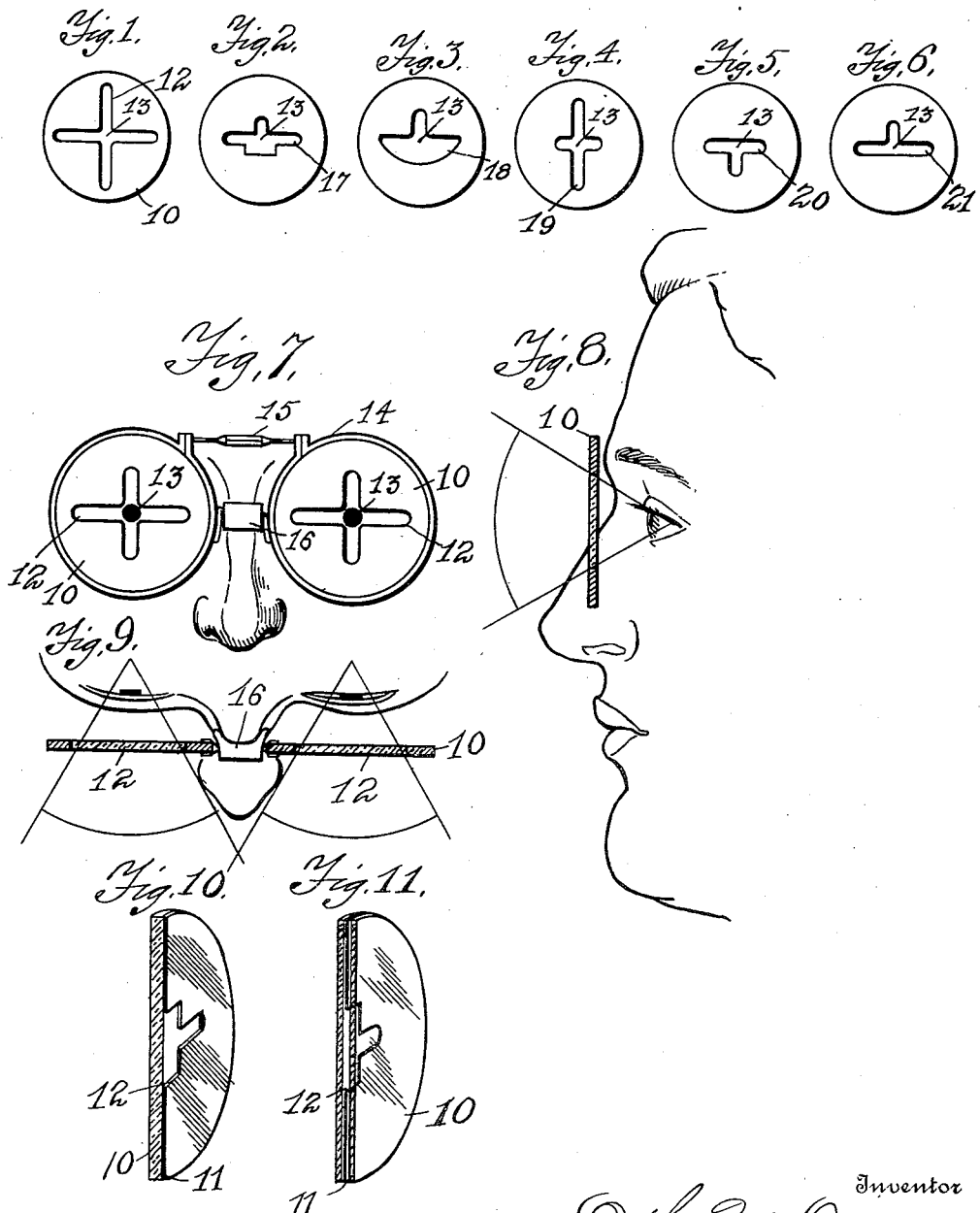

OTHO M. OTTE, OF JAMESTOWN, NEW YORK.

GOGGLES.

1,206,132.

Specification of Letters Patent.

Patented Nov. 28, 1916.

Application filed March 3, 1916. Serial No. 81,829.

*To all whom it may concern:*

Be it known that I, OTHO M. OTTE, a citizen of the United States, residing at the city of Jamestown, in the county of Chautauqua and State of New York, have invented certain new and useful Improvements in Goggles, of which the following, taken in connection with the accompanying drawings, is a specification.

The invention relates to goggles for shielding the eyes of the chauffeur or driver of a motor car, particularly from the rays of the sun and brilliant head lights in the night time to overcome the blinding of the eye and consequent incapacitation of the driver; and the improvement consists in providing glasses and shields for the eyes which are opaque or semi-opaque except in in the center of the line of vision and with vertical and horizontal vision field; and the invention consists in the novel features and combinations hereinafter set forth and claimed.

In the drawings, Figure 1 is an elevation of the preferred form of goggle shield or glass with the cross shaped clearance therein, the remainder of the field being opaqued, the arms of said cross shaped clearance extending from the center of vision; and Figs. 2, 3, 4, 5 and 6 show modifications of the preferred design shown in Fig. 1. Fig. 7 is an elevation of the goggles in correct position upon the face of the user showing the position of the centers of vision by dark spots. Fig. 8 is a sectional view of one of the goggles before the eye of the user showing the angle of the vertical field of vision by diverging lines from the eye; and Fig. 9 is a top plan view of the countenance of the user showing the horizontal or lateral field of vision by angular diverging lines from each eye, the goggles being shown in section in position before the eyes of the user. Fig. 10 is a sectional perspective view of half of one of the goggles showing the opaquing or semi-opaquing disk attached to the surface of the glass and the cross shaped vision field in the center thereof; and Fig. 11 is a similar view of a modification showing the goggle with the opaquing element between two glass disks.

Like characters of reference refer to corresponding parts in the several views.

The numeral 10 designates the goggles, each of which consists of a disk of transparent material such as glass which is limited as to the field of vision by an opaque or semi-opaque material 11 the same shape as the transparent disk. The opaquing disk may be of celluloid or paper or other non-transparent or semi-opaque material or coating attached to the transparent disks.

The limitation of the field of vision consists preferably of a slotted opening 12 central of the opaque disk or coating 11 and crossing the center of vision 13, which slot 12 is usually preferred in the shape of a cross, as shown in Figs. 1 and 7, which permits fairly wide or full angles of vertical and horizontal fields of vision without head movement, as shown in Figs. 8 and 9, yet gives large opaque fields of the goggles behind which the pupil of the eye can retire when it is desired to shield the eye from the glare of approaching head lights.

The vertical and horizontal arms of the cross-shaped opening 12 must invariably extend from the center of vision 13, the width of said arms or clearance slots being graduated according to the different uses for which the goggles are desired, which differences are generally graduated according to the power and position of the light or lights from which it is desired to protect the eye.

The modifications of the clearance slots in the center of the opaqued field of the goggles by different drivers or for different uses are shown in Figs. 2, 3, 4, 5 and 6, some users liking a broad angle of vertical and lateral vision, others desiring broad lateral vision and short or narrow vertical vision, while still others desire a larger field of vision around the center of vision. Thus in the different designs shown in the modifications, Fig. 2 shows a slot 17 with wide lateral vision and narrow vertical, the lower portion of the vertical being widened; and Fig. 3 shows much the same except that the lower portion 18 of the vertical field is given a still larger field which extends out to the ends of the lateral arms in a circle. Fig. 4 shows a wide vertical field of vision 19 with a narrow lateral field. Fig. 5 shows no vertical field above the lateral 20, this is to protect from an over-head light; and Fig. 6 is directly the opposite as to the vertical field above the lateral 21 to protect from a light beneath the eye. As stated, all of these designs must extend across the center of vision 13 which is for all automobile purposes the center of the goggle 10. The preferred form of narrow crosswise slots shown in Figs. 1 and 7 gives from seventy to ninety degree angles of vertical and lateral vision as shown in Figs. 8 and 9, at the same time providing ample protection for the eye in the opaqued fields.

The celluloid or other opaquing material or coating 11 is usually placed upon one surface of the transparent disk as shown in Fig. 10, though it may be placed between two transparent disks as shown in Fig. 11, thereby making it possible to use delicate coating or other materials which would be easily impaired if placed on the outer surface of a transparent disk.

In order that the center of vision 13 for the two disks 10 may be adjusted to the eyes of different individuals, a frame 14 is preferred in which the two disks 10 are adjustably supported so that they can be adjusted to the interpupillary distance or the distance between the centers of vision of the wearer, and when so adjusted will bring the pupil of each eye squarely in line with the center of vision 13 of the goggle. The frame 14 has a turn-buckle 15 attached to the rims of the goggles, the nose piece 16 being arranged to permit the movement of the disks or goggles 10 to and from one another. This arrangement enables the wearer to quickly adjust the width of vision of his goggles, thereby enabling him to have the desired vertical and lateral vision field. It is apparent that an adjustable frame is essential for goggles with limited vision fields.

The provision of vertical and horizontal crosswise slots, as shown in Figs. 1 and 7, which give from seventy to ninety degree angles of vertical and lateral vision without movement of the head is quite essential to the automobile driver since this gives the road ahead in full and that is all that is needed. Accidents happen so quickly at times that there is not time to turn the head in order to obtain full vision of the obstruction, hence any arrangement which did not give full vertical and lateral vision ahead would be objectionable. This full vision is attained by the vertical and horizontal cross clearance with the least possible obstruction of the vision while affording the largest protection.

I claim as new:

1. A goggle comprising a transparent disk, an opaquing or semi-opaquing material on said transparent disk having a straight horizontal clearance slot therein, the center of said slot intersected by a straight vertical clearance and the center of vision coinciding with the point of intersection of said slots to give full lateral and vertical vision without head movement.

2. A goggle comprising a transparent disk, an opaquing or semi-opaquing material on said transparent disk having vertical and horizontal clearance slots therein intersecting and coinciding with the center of the line of vision to give a full lateral and vertical field of vision without head movement.

3. A goggle comprising a transparent disk, a similarly shaped opaqued or semi-opaqued disk attached to said transparent disk, said opaqued or semi-opaqued disk having a slotted clearance opening in the form of a cross central of the line of vision to give a limited field of vision.

4. In a goggle, transparent disks, similar shaped opaqued or semi-opaqued disks attached to said transparent disks having clearance slots crosswise of the center of vision, and suitable frames for supporting said disks.

5. In a goggle, a frame, transparent disks in said frame, opaque or semi-opaque disks in said frame alongside said transparent disks, said opaque or semi-opaque disks having a cleared central portion in the form of a cross.

In testimony whereof I have affixed my signature in the presence of two witnesses.

OTHO M. OTTE.

Witnesses:
H. A. SANDBERG,
C. O. HULTGREN.